United States Patent Office 3,003,341
Patented Oct. 10, 1961

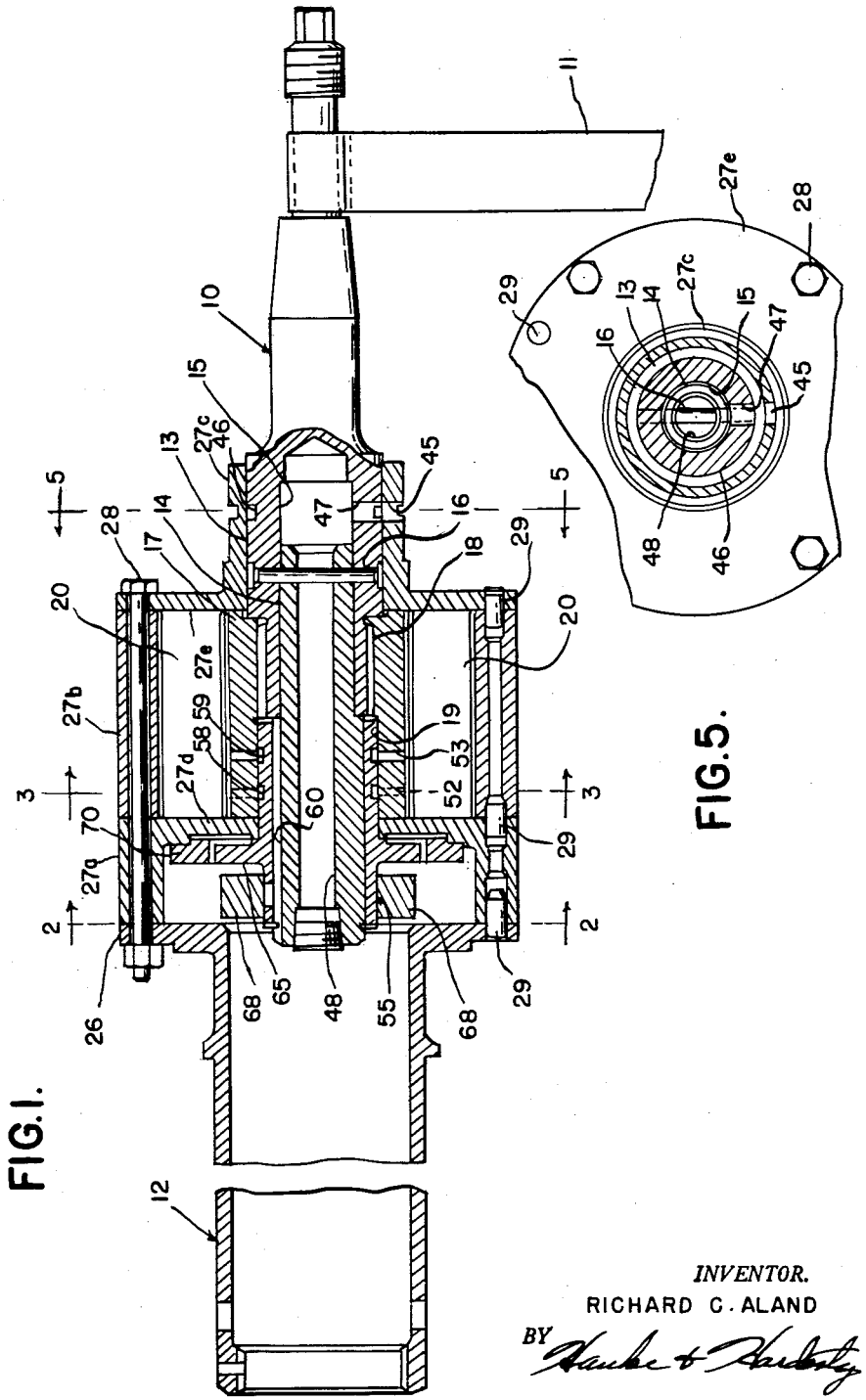

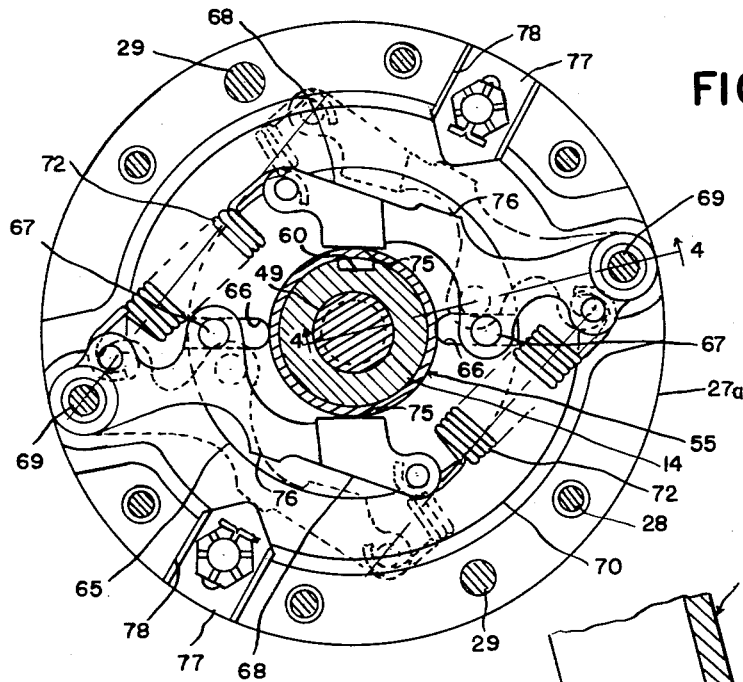
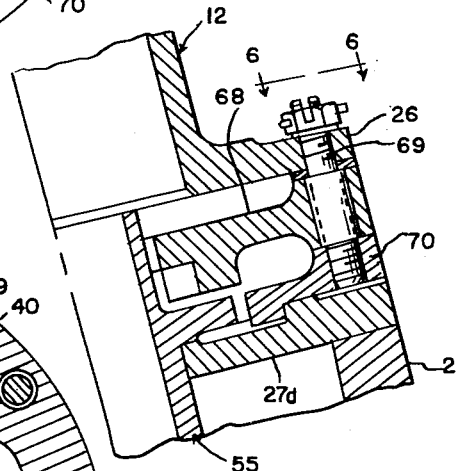
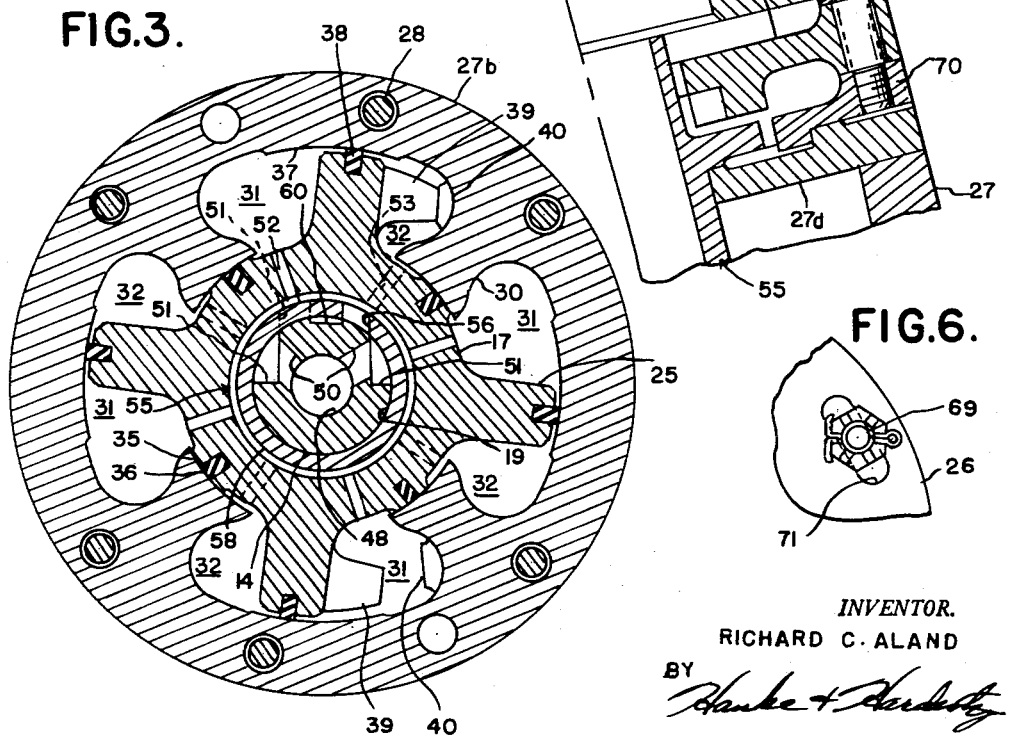
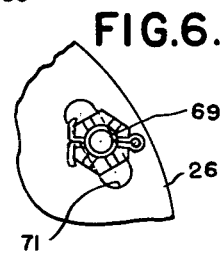

3,003,341
HYDRAULIC TIMING DEVICE
Richard C. Aland, Highland Park, Mich., assignor to Continental Motors Corporation, Muskegon, Mich., a corporation of Virginia
Filed Dec. 14, 1959, Ser. No. 859,465
7 Claims. (Cl. 64—25)

The present invention relates to timing devices and more particularly to a hydraulic timing control device adapted to advance and retard fuel injection timing in response to changes of speed in an internal combustion engine.

Just as the spark ignition of an internal combustion engine must be properly timed in relation to the engine speed for most effective combustion, so the injection of fuel in engines utilizing fuel injection systems needs to be properly timed. Best engine performance and more economical fuel consumption is obtained by timing the moment fuel is injected into the cylinder or the air intake relative to the engine speed. Various types of fuel injection pumps, pump controls and injection nozzle controls have been developed to achieve proper timing, but these depend on rather complex mechanisms which are difficult to adjust and maintain in proper timing.

This invention, utilizing a fuel injection pump driven by suitable gearing from the engine, is operable to directly advance or retard the timing of the fuel injection pump operation by constructing an adjustable fluid coupling drive operating in series with the fuel pump drive itself.

In particular, an object of the present invention is to improve fuel injection engine performance by providing a means for automatically timing the fuel injection in relation to engine speed.

Another object of the present invention is to facilitate fuel injection pump control by providing an adjustable fluid coupling in the injection pump driving mechanism.

A further object of the invention is to provide a fuel injection engine with an automatic fuel injection pump timing mechanism by constructing a pump driving means having an adjustable fluid coupling and an automatic actuating valve responsive to engine speed and operable to advance and retard the pump timing by altering the operative relationship of the fluid coupling driving and driven components.

Still another object of the invention is to facilitate automatic timing of a driving and a driven shaft by providing a hydraulic coupler between the shafts operated by a simplified control valve responsive to engine speed.

For a more complete understanding of the invention, reference may be had to the accompanying drawings illustrating a preferred embodiment of the invention in which like reference characters refer to like parts throughout the several views and in which:

FIG. 1 is a longitudinal cross-sectional view of a device embodying the present invention.

FIG. 2 is a cross-sectional view taken substantially on the line 2—2 of FIG. 1.

FIG. 3 is a cross-sectional view taken substantially on the line 3—3 of FIG. 1.

FIG. 4 is a fragmentary cross-sectional view taken substantially on the line 4—4 of FIG. 2.

FIG. 5 is a fragmentary cross-sectional view taken substantially on the line 5—5 of FIG. 1.

FIG. 6 is a fragmentary detail view as seen substantially from the line 6—6 of FIG. 4.

The preferred construction of the invention as illustrated comprises a driving shaft assembly 10 adapted for connection with a driving means such as an engine crankshaft gear 11 of an internal combustion engine (not shown), a driven shaft assembly 12 adapted for connection with an accessory such as a fuel injection pump (not shown) whose operation is in timed relation to the engine and is required to be adjusted in response to changes in engine speed.

In order to accomplish this timing, the angular relationship of the driving shaft 10 and driven shaft 12, which are disposed on a common axis of rotation, is altered, as will be described.

The driving shaft assembly 10 includes a center portion 13 having a preferably tubular extension 14 secured in a central bore 15 of the center portion by any means such as a pin 16. A hub portion 17 is secured by any means such as splines 18 to the center portion 13 and in part is radially spaced from the extension 14 to provide an annular valve chamber 19. The hub portion 17 has a plurality of outwardly radially extending drive vanes 20 as shown in FIG. 3.

The driven shaft assembly 12 includes an annular flange 26 on which is mounted a three part housing, parts 27a, 27b, and 27c respectively, by any means such as bolts 28, the parts being located by any means such as pins 29. The part 27b is a cylindrical housing and has inwardly radially extending driven vanes 30, as shown in FIG. 3, disposed intermediate and angularly spaced from the hub vanes 25 to provide advance chambers 31 and retard chambers 32 respectively on opposite sides of each hub vane 25, as shown in FIG. 3. The part 27a includes an end wall 27d at one end of the housing 27b, and the part 27c includes an end wall 27e at the other end of the housing 27b, so that the end walls 27d and 27e with the housing 27b enclose the hub portion 17 and its vanes 20.

The hub portion 17 has raised bosses 35 provided with sealing elements 36, and the inner edges of the housing vanes 30 are arcuately formed to ride on the bosses 35. Similarly the interior of the housing 27b is provided with bosses 37, the hub vanes 25 having sealing elements 38 riding on said bosses 37. The mechanism as described thus forms a hydraulic coupling between the driving shaft 10 and the driven shaft 12 when the chambers 31 and 32 are filled with fluid. The housing 27b is angularly adjustable with respect to the hub portion 17, and in order to limit maximum adjustment, stop elements 39 and 40 are respectively provided on the hub vanes 25 and the housing vanes 30.

The part 27c is tubular, being carried on the center shaft portion 13, and has a radially extending passage 45 adapted for connection with a source of fluid pressure supply, preferably the oil pressure system (not shown) of the engine. The center shaft portion 13 has an annular groove 46 openly connected with the passage 45, and a radially inwardly extending passage 47 communicating the groove 46 with the inner bore 15 as shown in FIGS. 1 and 5.

The extension 14 has a central bore 48 closed at the outer end by any means such as a plug 49 and open at the inner end to the bore 15. That part of the extension 14 which is within the hub is provided with a pair of outwardly extending passages 50 communicating the bore 48 with a pair of accurately angularly spaced recesses 51 in the outer side of the extension 14 and open to the annular chamber 19, as shown in FIG. 3. The hub portion 17 has an "advance" passage 52 openly connecting each advance chamber 31 with the annular chamber 19, and a similar "retard" passage 53 openly connecting each retard chamber 32 with the annular chamber 19. The passages 52 are axially spaced from the passages 53, as indicated in FIGS. 1 and 3.

A valve structure 55 is disposed in the annular chamber 19, fitting closely around the extension 14 and closely within the hub portion 17. As shown in FIG. 3, the valve structure 55 is in the neutral position. In this position, a pair of accurately annularly spaced ports 56 and 57 are disposed intermediate the recesses 51 of the extension 14 so that the body of the valve structure 55 normally closes the recesses 51. This is hereinafter referred to as the "neutral" position.

The ports 56 and 57 respectively communicate with a pair of outer axially spaced annular grooves 58 and 59 in the valve structure 55, the grooves 58 and 59 being openly connected at all times respectively with the passages 52 and 53 in the hub portion 17.

The shaft extension 14 is also provided with an outer axially extending groove 60 which, when the valve is in the neutral position, is disposed intermediate the ports 56 and 57 and is closed by the body of the valve structure 55.

The valve structure 55 is angularly adjustable in the annular chamber 19 with respect to the driving shaft extension 14 and hub 17, and operates to control fluid flow to and from the chambers 31 and 32 to angularly adjust the driven shaft housing vanes 30 with respect to the hub vanes 25, depending to which side of the hub vanes 25 fluid pressure is directed through the passages 52 and 53. Referring to FIG. 3, when the valve structure 55 is adjusted clockwise, the valve port 56 opens to one of the recesses 51 and fluid pressure is admitted to the annular groove 58 and thence directed through the hub passages 52 to the advance chambers 31. The valve port 57 is at the same time opened to the axial groove 60 so that fluid pressure is relieved from the retard chambers 32 through the hub passages 53, annular groove 59 and valve port 57. This motion of the valve structure is designated as being toward the advance position.

In reverse fashion, when the valve structure is adjusted counterclockwise, the valve port 57 opens to the other recess 51 and fluid pressure is admitted to the annular groove 59 and thence directed through the hub passages 53 to the retard chambers 32. The valve port 56 is at the same time opened to the axial groove 60 so that fluid pressure is relieved from the advance chambers 31 through the hub passages 52, annular groove 58 and valve port 56. This motion of the valve structure is designated as being toward the retard position.

The valve structure 55 has an annular flange 65 disposed outwardly of the end wall 27d and provided with a pair of radially extending slots 66, as shown in FIG. 2, into which extend actuating pins 67 carried respectively by a pair of flyweights 68. The flyweights are pivotally carried by studs 69 secured to an angularly adjustable mounting ring 70 supported on the outer face of the end wall 27d, the studs 70 also being secured to the driven shaft flange 26, as seen in FIG. 4. The stud 69 extends through a slot 71 provided in the flange 26, as indicated in FIG. 6, to permit angular adjustment of the ring 70 and hence the flyweights 68 to angularly set the position of the valve structure 55.

The flyweights will be urged outwardly toward the dotted line positions of FIG. 2 by centrifugal forces when the shafts and associated assemblies are rotating, and these forces are opposed by springs 72 connected between the flyweights. It will be noted that as the flyweights move inwardly and outwardly, the pins 67 will correspondingly angularly adjust the valve structure 55 in one direction and the other relative to the connected driving shaft extension 14 and hub 17, to respectively effect the retard and advance operation hereinbefore described. At any given speed, the pins 67 carried by the flyweights 68 will tend to hold the valve structure 55 in a fixed relative position which, at a predetermined speed will be the neutral position described above. When the speed decreases from this, the flyweights will move inward, rotating the valve structure 55 clockwise and directing fluid pressure to the advance chamber 31, shifting the hub vanes 25 clockwise relative to the housing vanes 30, thereby angularly adjusting the relative angular relationship of the driving shaft 10 with the driven shaft in the desired direction. In an internal combustion engine, this adjustment may operate to advance and retard fuel injection operation in relation to engine speed.

When shaft speed increasess from the predetermined speed, the flyweights 68 will move outward, rotating the valve structure 55 counterclockwise and directing fluid pressure to the retard chamber 32, shifting the hub vanes 25 counterclockwise relative to the housing vanes 30.

The inward movement of the flyweights 68 is limited by the valve structure 55, the flyweights 68 having bosses 75 which contact the valve structure 55. The flyweights 68 also have second bosses 76 which contact radially adjustable stop elements 77, mounted in slots 78 provided in the part 27a, to limit outward movement of the flyweights 68.

Although there has been described only one preferred embodiment of the invention, it will be apparent to one skilled in the art to which the invention pertains that various changes and modifications may be made therein without departing from the spirit of the invention or the scope of the appended claims.

I claim:

1. A device for timing the angular relationship of connected rotating shafts, comprising a driving shaft, a driven shaft axially aligned with and angularly adjustable with respect to said driving shaft, said driving shaft having a center portion and a hub portion concentric with said center portion and in part radially spaced therefrom to provide an annular valve chamber between said center and hub portions, said hub portion being secured to and rotatable with said center portion, said hub portion having radially outwardly extending vanes, said driven shaft having a cylindrical housing radially spaced from said hub portion and provided with end walls to enclose said hub portion vanes, said housing having radially inwardly extending vanes intermediate and angularly spaced from said hub portion vanes to provide arcuate fluid chambers on each side thereof, said driving shaft being operable to drive said driven shaft through fluid in said arcuate chambers hydraulically connecting said vanes, said center portion having a fluid pressure passage adapted for connection with a source of fluid under pressure and port means connecting said pressure passage with said annular valve chamber, said hub having passages openly connecting said annular valve chamber with each of said arcuate fluid chambers, an annular valve structure in said annular chamber and angularly adjustable therein, said valve structure having passages selectively connecting said center portion port means with said hub passages and operable to direct fluid to one or the other side of said hub vanes on angular movement of said valve respectively in one or the other direction with respect to said driving shaft, and actuating means actuating said valve responsive to variations of shaft speed from a predetermined neutral value.

2. A device for timing the angular relationship of connected rotating shafts, comprising a driving shaft, a driven shaft axially aligned with and angularly adjustable with respect to said driving shaft, said driving shaft having a center portion and a hub portion concentric with said center portion and in part radially spaced therefrom to provide an annular valve chamber between said center and hub portions, said hub portion being secured to and rotatable with said center portion, said hub portion having radially outwardly extending vanes, said driven shaft having a cylindrical housing radially spaced from said hub portion and provided with end walls to enclose said hub portion vanes, said housing having radially inwardly extending vanes intermediate and angularly spaced from said hub portion vanes to provide arcuate fluid chambers on each side thereof, said driving shaft being operable to drive said driven shaft through fluid in said arcuate chambers hydraulically connecting said vanes, said center portion having a fluid pressure passage adapted for connection with a source of fluid under pressure and port means connecting said pressure passage with said annular valve chamber, said hub having passages openly connecting said annular valve chamber with each of said arcuate chambers, an annular valve structure in said annular valve chamber and angularly adjustable therein, said valve structure having a pair of axially spaced annular grooves, in the outer surface and respectively at all times connected with the arcuate chambers on opposite sides of said hub vanes, said valve structure having a pair of angularly and axially spaced substantially radial ports respectively open to said annular grooves, said center portion port means comprising a pair of angularly spaced longitudinally extending recesses in the outer surface and spaced apart a distance such that the ports of said valve structure when in a neutral position are intermediate and disconnected from said recesses, said valve structure when angularly adjusted in one direction from said neutral position being operable to openly register one of said valve ports with one of said recesses, said valve structure when angularly adjusted in the opposite direction from said neutral position being operable to openly register the other of said valve ports with the other of said ports, and actuating means angularly adjusting said valve structure in one or the opposite direction from said netral position in response to variations of shaft speed from a predetermined neutral value.

3. The device as defined in claim 2 and in which said driving shaft center portion has an exterior axially extending groove positioned intermediate said valve structure ports when said valve structure is in said neutral position, said valve structure when angularly adjusted in the first mentioned direction being operable to openly register the second mentioned valve port with said axially extending groove and when angularly adjusted in the second mentioned direction being operable to openly register the first mentioned connecting passage with said axially extending groove whereby to exhaust fluid pressure from that fluid chamber not being connected with pressure from the fluid pressure passage.

4. The device as defined in claim 1 and in which said actuating means comprises a flyweight pivotally carried on said housing and rotatable therewith, said flyweight being urged outwardly by centrifugal forces, and means resiliently urging said flyweight inwardly in resistance to said centrifugal forces, and means connecting said flyweight with said valve structure and operable to angularly adjust same on inward and outward movement of said flyweight.

5. The device as defined in claim 4 and in which said housing has a radially adjustable stop disposed in the plane of movement of said flyweight and operable to limit outward movement thereof.

6. The device as defined in claim 4 and including means angularly adjusting said flyweight on an axis common to said shaft axis.

7. The device as defined in claim 1 and in which said actuating means comprises a flyweight pivotally carried on said housing and rotatable therewith, said flyweight being urged outwardly by centrifugal forces, said valve structure having an outwardly extending flange provided with a radially extending slot, said flyweight having a pin extending into said slot and operable on inward and outward movement of said flyweight to angularly adjust said flange in respectively opposite directions.

References Cited in the file of this patent
UNITED STATES PATENTS

| | | |
|---|---|---|
| 2,708,353 | Brady | May 17, 1955 |
| 2,708,354 | Brady et al. | May 17, 1955 |
| 2,743,593 | Bischoff | May 1, 1956 |